United States Patent [19]
Davis

[11] Patent Number: 6,058,478
[45] Date of Patent: *May 2, 2000

[54] APPARATUS AND METHOD FOR A VETTED FIELD UPGRADE

[75] Inventor: Derek L. Davis, Phoenix, Ariz.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/847,926

[22] Filed: Apr. 28, 1997

Related U.S. Application Data

[63] Continuation of application No. 08/316,211, Sep. 30, 1994, abandoned.

[51] Int. Cl.[7] .................................................... H04L 9/32
[52] U.S. Cl. ......................... 713/191; 713/170; 713/173
[58] Field of Search .............................. 380/21, 23–25, 380/29, 30; 713/170, 191, 189, 172, 173

[56] References Cited

U.S. PATENT DOCUMENTS

| | | |
|---|---|---|
| 4,092,524 | 5/1978 | Moreno . |
| 4,206,315 | 6/1980 | Matyas et al. . |
| 4,215,421 | 7/1980 | Giraud . |
| 4,467,139 | 8/1984 | Mollier . |
| 4,544,833 | 10/1985 | Ugon . |
| 4,549,075 | 10/1985 | Saada et al. . |
| 4,578,531 | 3/1986 | Everhart et al. ........................ 380/21 |
| 4,656,342 | 4/1987 | Ugon . |
| 4,656,474 | 4/1987 | Mollier et al. . |
| 4,658,093 | 4/1987 | Hellman . |
| 4,771,461 | 9/1988 | Matyas ..................................... 380/24 |
| 4,807,288 | 2/1989 | Ugon et al. . |
| 4,825,052 | 4/1989 | Chemin et al. . |
| 4,907,270 | 3/1990 | Hazard . |
| 4,907,272 | 3/1990 | Hazard et al. . |
| 4,910,774 | 3/1990 | Barakat . |
| 4,962,532 | 10/1990 | Kasiraj et al. ............................ 380/25 |
| 5,140,634 | 8/1992 | Guillou et al. . |
| 5,142,579 | 8/1992 | Anderson ................................. 380/30 |
| 5,153,581 | 10/1992 | Hazard . |
| 5,214,702 | 5/1993 | Fischer ..................................... 380/30 |
| 5,218,637 | 6/1993 | Angebaud et al. . |
| 5,231,666 | 7/1993 | Matyas ..................................... 380/25 |
| 5,293,424 | 3/1994 | Holtey et al. . |
| 5,323,464 | 6/1994 | Elander et al. .......................... 380/24 |
| 5,371,794 | 12/1994 | Diffie et al. .............................. 380/21 |
| 5,396,558 | 3/1995 | Ishiguro et al. .......................... 380/25 |
| 5,422,953 | 6/1995 | Fischer ..................................... 380/23 |
| 5,442,704 | 8/1995 | Holtey . |
| 5,442,706 | 8/1995 | Kung ........................................ 380/30 |
| 5,499,295 | 3/1996 | Cooper ..................................... 380/23 |
| 5,787,172 | 7/1998 | Arnold ...................................... 380/21 |

OTHER PUBLICATIONS

IBM Technical Disclosure Bulletin, "Cryptographic Mocrocode Loading Controller for Secure Function", vol. 34, No. 4B, Sep. 1991, pp. 34–36.

*Primary Examiner*—Gilberto Barrón, Jr.
*Attorney, Agent, or Firm*—Blakely, Sokoloff, Taylor & Zafman LLP

[57] ABSTRACT

A cryptographic device being remotely modified only by proper authorization. The cryptographic device comprising a processor, non-volatile memory and a bus interface. The non-volatile memory stores at least a public key of an upgrade entity and possibly a public key of a regulatory entity, a unique, device-specific encryption/decryption key pair and/or internal memory for storing cryptographic programs. The processor processes the cryptographic programs to modifying contents of the non-volatile memory based on an upgrade directive within an upgrade message transmitted by the upgrade entity to the cryptographic device.

32 Claims, 10 Drawing Sheets

*Figure 8D*

APPARATUS AND METHOD FOR A VETTED FIELD UPGRADE

CROSS-REFERENCES TO RELATED APPLICATIONS

This is a Rule 1.62 Continuation of application Ser. No. 08/316,211, filed Sep. 30, 1994, now abandoned.

BACKGROUND OF THE INVENTION

1. Field of the Invention

The present invention relates to the field of cryptography. More particularity, the present invention relates to a cryptographic device which may be modified under regulated conditions.

2. Background Art Related to the Invention

In this country, a "regulatory" entity, typically a Federal or State agency, closely scrutinizes the exportation of cryptographic technology from a "domestic" export entity, namely an individual, partnership or corporation principally residing in the United States, to a foreign customer principally residing outside the borders of the United States. Usually, this regulatory entity requires the domestic entity to apply for and obtain an "export" license, being a form of written authorization from the regulatory entity, before being allowed to legally export cryptographic technology to the foreign customer. The available scope of the license depends on the nature of the cryptographic technology (e.g., whether its based on software or hardware, supported key length, etc.)

For example, for cryptographic software using cryptographic keys of restricted bit length usually forty (40) bits or less, the domestic entity may obtain a regional license generally referred to as a "commodity jurisdiction export license" from the regulatory entity. The commodity jurisdiction export license enables the domestic entity to legally export the cryptographic software to any number of foreign customers in a certain country or region of that country.

Besides licensing requirements, exports restrictions on the capabilities of the cryptographic technology are currently imposed by the regulatory entity. To conform to these export restrictions, the regulatory entity requires cryptographic keys to be 40-bits or less in length, even though a conventional Data Encryption Algorithm (normally referred to as "DES"), supports cryptographic keys up to fifty-six (56) bits in length. Thus, in accordance with current export restrictions, the functionality of the cryptographic technology must be substantially degraded in order for the domestic entity to obtain the export license. However, such restrictions are occasionally altered by this regulatory entity as technology advances.

One disadvantage associated with export restrictions is that they perpetuate reluctance by foreign customers to purchase cryptographic technology domestically because occasional changes in export restrictions may render previously exported technology obsolete. For example, suppose that a domestic entity sells a number of cryptographic hardware devices having 40-bit cryptographic keys to a foreign customer. A few weeks later, the regulatory entity relaxes export restrictions now allowing 56-bit cryptographic keys. Now, the foreign customer is utilizing cryptographic hardware that is obsolete and perhaps incompatible with future products. Of course, this reluctance could be mitigated by allowing a cryptographic device that is capable of being modified after manufacture.

Under current export laws, modifiable cryptographic devices may be sold only to domestic customers. The reason that modifiable cryptographic devices are not allowed to be exported to foreign customers is that these devices could be altered in the foreign countries without authorization by the regulatory entity. By providing a modifiable cryptographic device which can be modified only upon receipt of proper authorization from the regulatory entity, it may be possible to ease export restrictions on modifiable cryptographic devices. Additionally, similar to cryptographic software, the regulatory entity may be able to allow regional licenses for such modifiable cryptographic devices which would greatly reduce the costs associated with heightened regulated supervision currently required.

Additionally, restrictions on cryptographic device capabilities may be instituted even for those devices domestically distributed. For example, some cryptographic devices may require governmental regulation or a federally or state imposed "waiting" period before sales of such cryptographic devices may occur.

Hence, based on the foregoing, it would be desirable to develop and implement a cryptographic device in which its cryptographic keys and/or cryptographic algorithms could be modified only with proper authorization by an entity authorized to modify or "upgrade" the cryptographic device (hereinafter referred to as an "upgrade entity") and/or a regulatory entity as well as a method associated with such modification. Accordingly, the present invention may provide the cryptographic device as an integrated circuit component including a storing element for internally storing a public key of the upgrade entity for use in decrypting a digital signature from the upgrade entity, thus verifying that an upgrade directive originated from the upgrade entity.

The present invention may also provide the cryptographic device as an integrated circuit component including a storing element for internally storing a public key of the regulatory entity for use in decrypting a digital signature from the regulatory entity, thus verifying that the upgrade directive is authorized by the regulatory entity.

The present invention may further provide the cryptographic device as an integrated circuit component with the capability of internally generating a unique public/private key pair for potential use in performing encryption/decryption operations, securely containing and using the public/private key pair within the cryptographic device to substantially prevent detection of the key pair through reverse engineering, as well as providing a modifiable cryptographic device as a unique integrated circuit component which can remotely perform guaranteed authorized modifications.

BRIEF SUMMARY OF THE INVENTION

In one embodiment, the invention relates to a method for ensuring an authorized modification of a cryptographic device. For this method, an upgrade message is received. The upgrade message includes an upgrade directive message including an upgrade directive and an upgrade signature. The upgrade directive message is encrypted with a private key of an upgrade entity, and a second message of the regulatory signature is encrypted with a private key of a regulatory entity. The upgrade message verifies within the cryptographic device that the upgrade message is valid and that modification of the cryptographic device has been authorized. The upgrade message then changes the stored contents of the cryptographic device if the upgrade message is valid and that modification of the cryptographic device has been authorized.

BRIEF DESCRIPTION OF THE DRAWINGS

The features and advantages of the present invention will become apparent from the following detailed description of the present invention in which.

DETAILED DESCRIPTION OF THE INVENTION

The present invention relates to an apparatus and method for providing a cryptographic device which could be modified remotely only by proper authorization; namely, by an upgrade entity for "non-regulated" cryptographic devices or both the upgrade entity and a regulatory entity for "regulated" cryptographic devices. In the following description, numerous details are set forth in order to provide a thorough understanding of the present invention. However, it is apparent to one skilled in the art that the present invention may be practiced through many different embodiments than that illustrated without deviating from the spirit and scope of the present invention. In other instances, well-known circuits, elements and the like are not set forth in detail in order to avoid unnecessarily obscuring the present invention.

In the detailed description, a number of cryptography-related terms are frequently used to describe certain characteristics or qualities which is defined herein. A "key" is an encoding and/or decoding parameter for a conventional cryptographic algorithm. More specifically, the key is a sequential distribution ("string") of binary data being "n" bits in length, where "n" is an arbitrary number. A "message" is generally defined as information (e.g., encrypted keys address, and data) being transferred. The information may include a challenge or a return response. A "upgrade message" is generally defined as information (e.g., encrypted keys, address and data) being transferred in a sequence of bus cycles for modifying or reconfiguring a receiving node (defined below). The information may include software code or other information intended to replace information at a certain location in non-volatile memory. A "digital certificate" is defined as any information pertaining to an entity initiating communications, typically its public key, encrypted through use of a private key by a widely published trusted authority (e.g., bank, governmental entity, trade association, etc.). A "digital signature" is similar to a digital certificate but is used for authentication of the message itself, not the sender. An "upgrade signature" is a digital signature appended to an upgrade message signifying that the signing entity authorizes the corresponding upgrade.

Other terms unrelated to cryptography but used throughout this application includes the following. A "node" is defined as an apparatus comprising a central processing unit, associated memory and interfacing circuitry. Moreover, an "entity" is defined as an individual, partnership, corporation or any other group of person(s) having a node identified by a public key. A sub-category of the entity is an "upgrade entity" being a manufacturer, distributor, retailer, licensee, assignee or any other entity authorized to upgrade at least one targeted modifiable cryptographic device (referred to as "target device(s)"). Another sub-category is a regulatory "entity" being a bank, local or governmental agency, trade association or any other trusted authority involved in regulating cryptographic devices. The term "changing" (and any other tense) is used herein to broadly define adjustment of the functional characteristic(s) of a cryptographic device through modification, addition, or deletion of various stored contents within the cryptographic device.

In this age of information, it is becoming more and more desirable to transmit digital information from one location to another. As a result, many entities are now using cryptographic technology to transfer information in a manner which is clear and unambiguous to a legitimate receiver, but incomprehensible to any illegitimate recipients. It is contemplated that cryptography technology could be upgraded in accordance with some combination of conventional cryptographic techniques; namely, symmetric key cryptography or asymmetric (or public) key cryptography.

Figure 1:
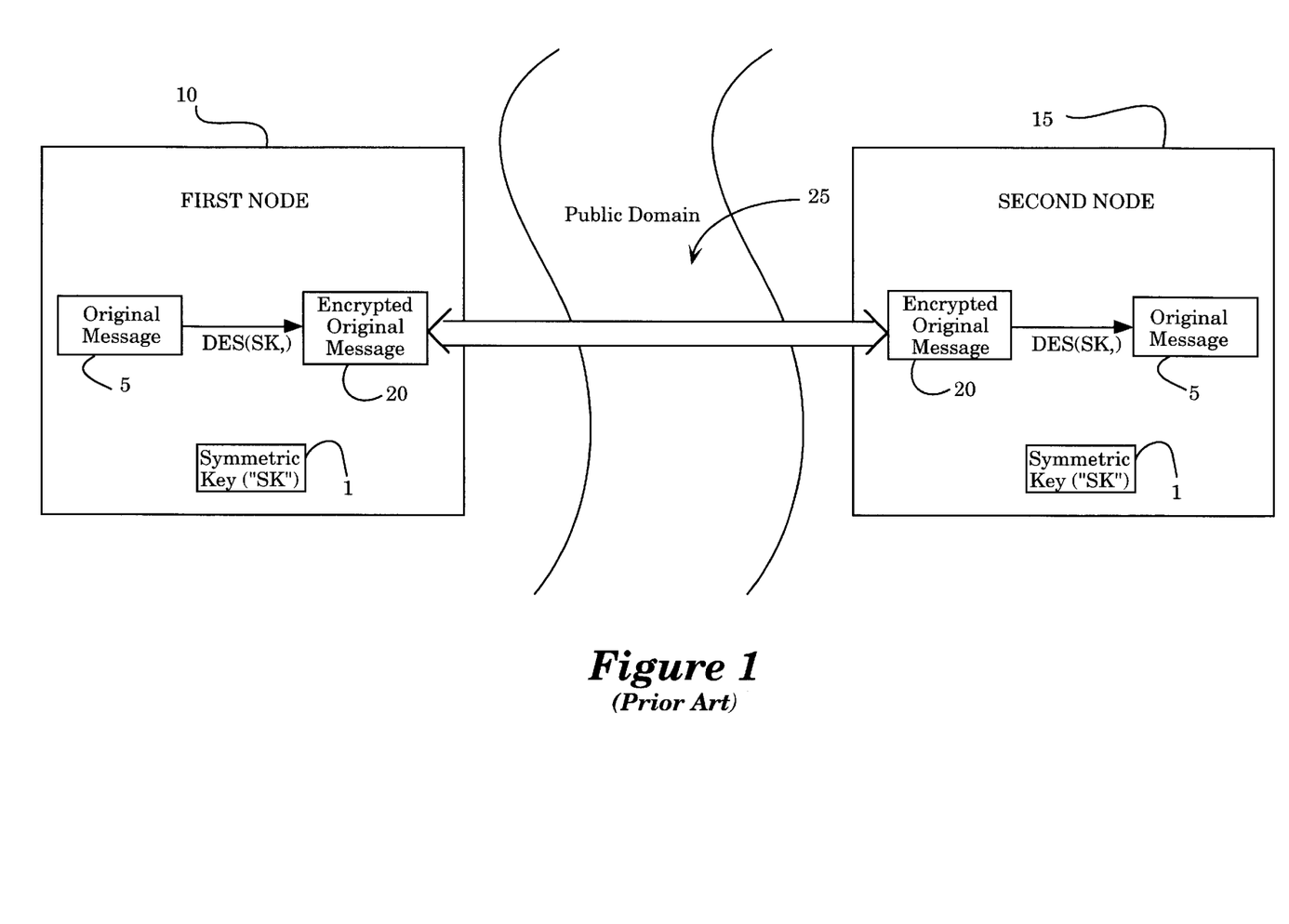
FIG. 1 is a block diagram illustrating a bi-directional symmetric key encryption and decryption process.

Referring to FIG. 1, an illustrative embodiment of the symmetric key cryptography technique is illustrated. This technique requires the use of an identical i.e., symmetric secret key (labeled "SK") 1 to encrypt an original message 5 being transmitted between a first node 10 and a second node 15 to form an encrypted original message 20 and to decrypt the encrypted original message 20 to recover the original message 5. Such encryption and decryption is performed through well-known conventional cryptographic algorithms such as, for example, the Data Encryption Algorithm, more commonly referred to as "DES". The original message 5 is (i) encrypted at the first node 10, (ii) transmitted from the first node 10 to the second node 15 through a public domain 25 such as a telephone lines and the like and (iii) decrypted at the second node 15. However, this technique is difficult to support with a large number of users because it requires prior establishment of secret keys ("SK").

Figure 2:
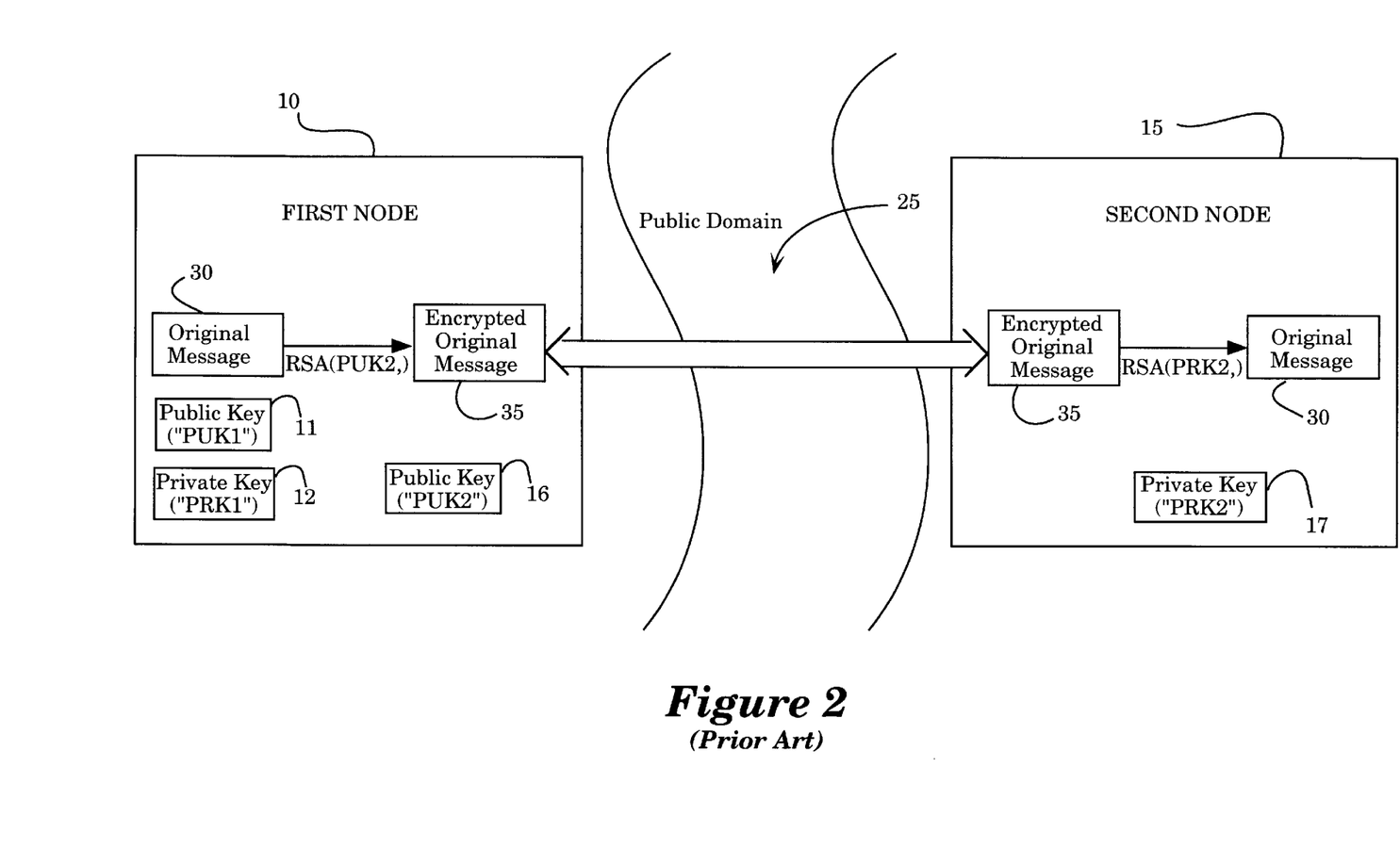
FIG. 2 is a block diagram illustrating a bi-directional asymmetric key encryption and decryption process.

Referring now to FIG. 2, an illustrative embodiment of the asymmetric key technique is shown. This technique employs two separate keys (referred to as a "public key" and "private key") being used separately for encryption and decryption purposes. For establishing bi-directional communications from the first node 10 to the second node 15, a "public" key 16 ("PUK2") of the key pair of the second node 15 is stored in and generally used by the first node 10 to encrypt an original message 30 under an asymmetric "RSA" algorithm well known in cryptography. This forms an encrypted original message 35 to be transmitted to the second node 15. A public ("PUK1") and private ("PRK1") key pair 11 and 12 of the first node 10 are further stored in the first node 10.

A "private" key 17 of the key pair of the second node 15 ("PRK2") is exclusively known and used by the second node 15 for many purposes, including to decrypt the encrypted message 35 from the first node 10 under the RSA algorithm as shown in FIG. 2. However, this technique is susceptible to attempts by an illegitimate entity (e.g., commercial spy) to impersonate a legitimate entity (e.g., employee, joint-venturer, etc.) by sending fraudulent messages to another legitimate entity for the purpose of disrupting work flow or obtaining confidential information. Thus, additional protocols are commonly used to authenticate a message and legitimize the entity sending the message.

Figure 3:
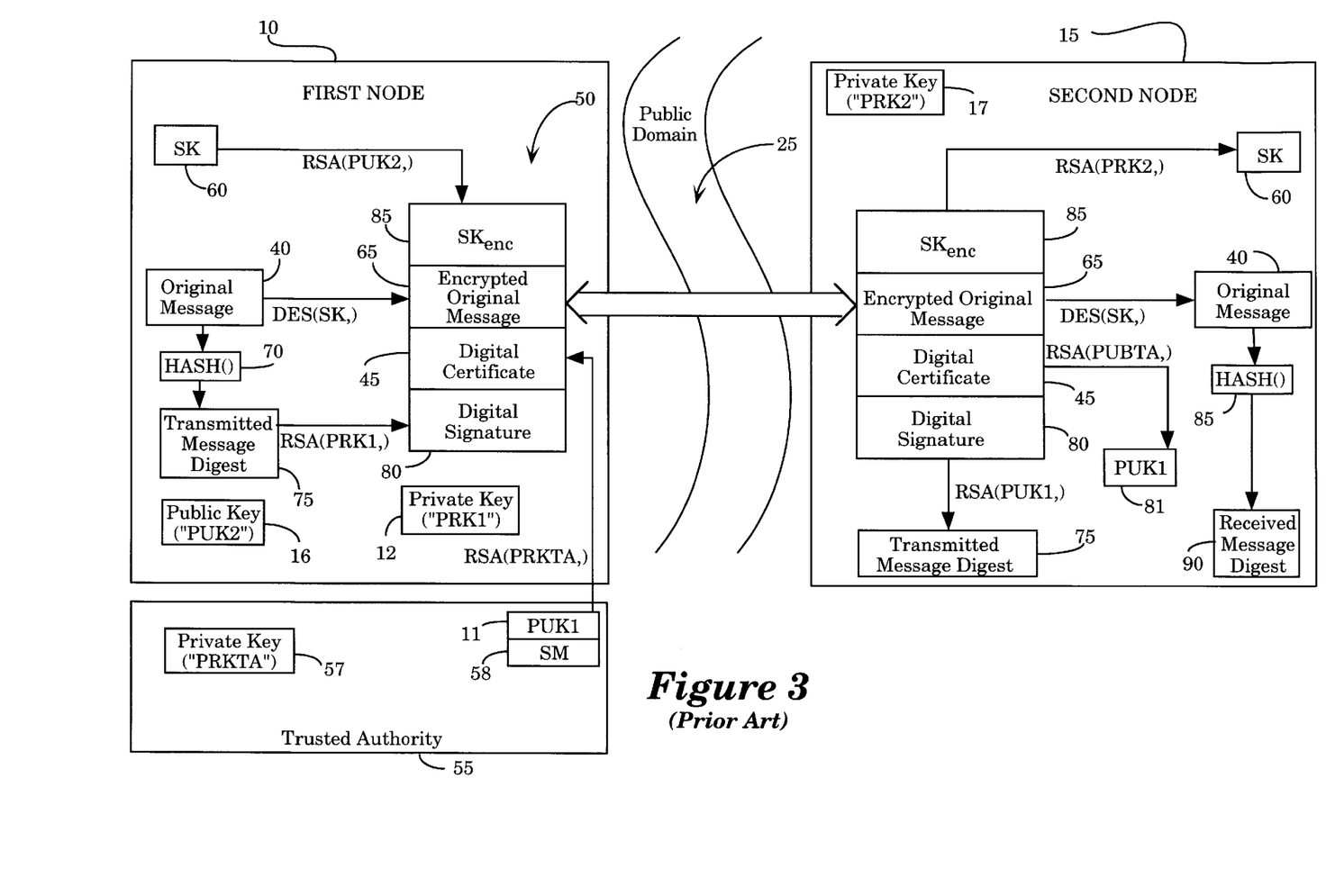
FIG. 3 is a block diagram illustrating a digital certification process from a trusted authority.

Authentication of the sender (i.e., verifying that the sender of a public key is, in fact, the true owner of the public key) is a problem when communications are initially established between previously unknown parties. As shown in FIG. 3, this problem is commonly avoided by incorporating a digital certificate 45 within a transmission message 50. The digital certificate 45 is issued by a mutually trusted authority 55 (e.g., a bank, governmental entity, trade association, etc.) by encrypting a public key of the node initiating the communications ("PUK1") 11 with a signature statement ("SS") 58 with a private key ("PRKTA") 57 of the trusted authority 55 so that fraudulent attempts to use PUK2 16 will simply result in an unreadable response to the transmission message by its recipient. The selected trusted authority 55 depends on the parties involved. For example, two individuals employed by the same business could both trust the certificates issued by a corporate security office of the business. Employees of two independent business entities, however, would require not only the certificates from the respective security offices, but also the certificates from, for example, some industry trade organization that certifies such business entities.

In this approach, multiple operations are concurrently performed to construct the transmission message 50. One operation is that an original message 40 is encrypted using a symmetric secret key ("SK") 60 via the DES algorithm to form the encrypted original message 65 which is input into the transmission message 50 along with the digital certificate 45. The original message 40 also undergoes a hash algorithm 70 (e.g., a "MD5" algorithm) to form a transmitted message digest 75. The transmitted message digest 75 is further encrypted using a private key of the first node ("PRK1") 12 to form a digital signature 80 which is input into the transmission message 50. Additionally, the symmetric key ("SK") 60 is encrypted with a public key of the second node ("PUK2") 16 under the RSA algorithm resulting in "$SK_{enc}$" 85 and further input to the transmission message 50.

Referring still to FIG. 3, upon receipt of the transmission message 50 from the first node 10 being transmitted through the public domain 25, the second node 15 decrypts the $SK_{enc}$ 85 with its private key ("PRK2") 17 and the digital certificate 45 with a published public key ("PUBTA") of the trusted authority 55 to obtain SK 60 and PUK1 11. These SK and PUK1 keys 60 and 11 are used to decrypt the encrypted original message 65 and the digital signature 80 to retrieve the transmitted message digest 75 and the original message 40, respectively. The original message 40 then undergoes a hash algorithm 85, identical to that performed in the first node 10. The results (referred to as a "received message digest") 90 are compared to the transmitted message digest 75. If the transmitted message digest 75 is identical to the received message digest 90, communications are maintained between these legitimate nodes.

Figure 4:
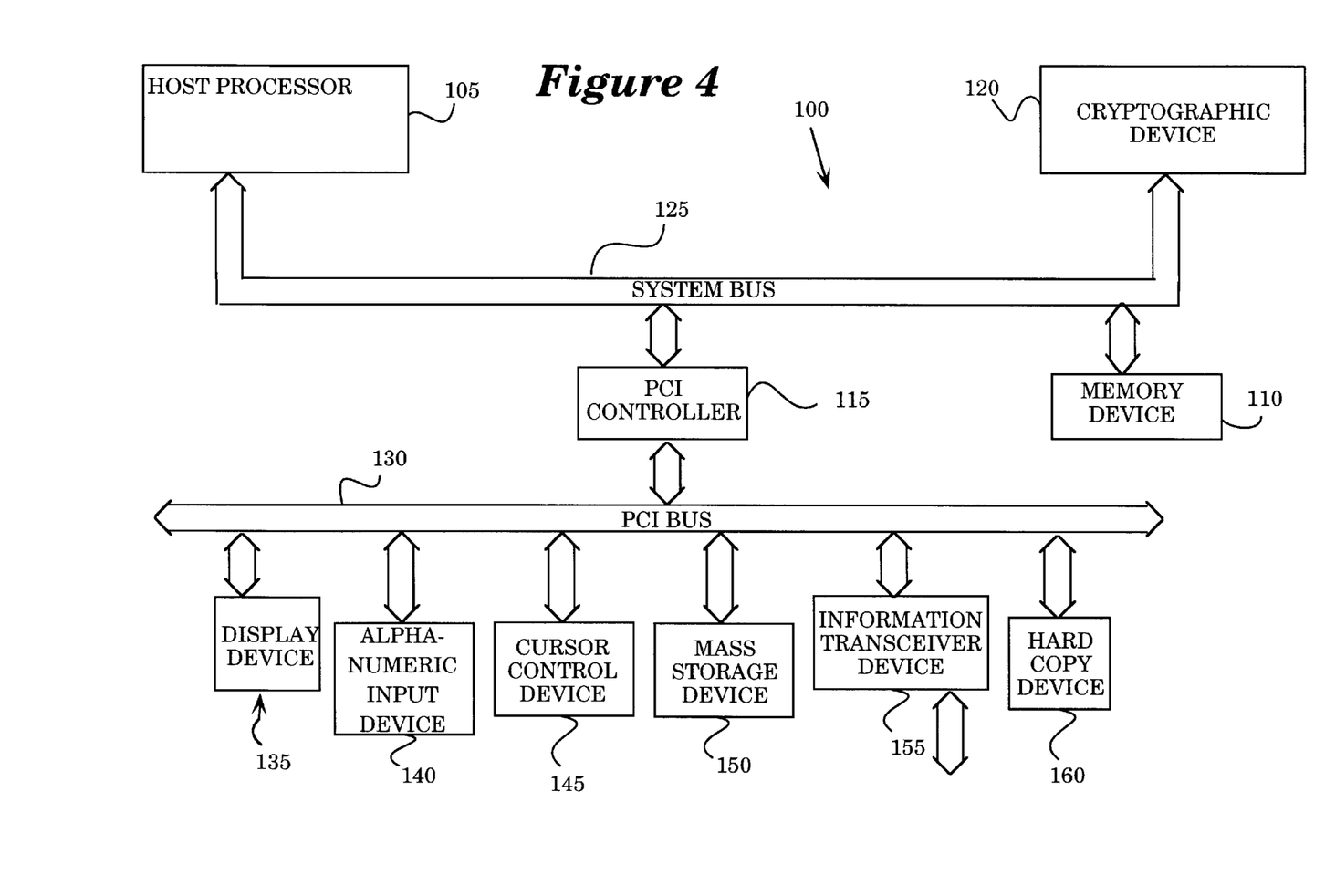
FIG. 4 is a block diagram of a computer system incorporating an illustrative embodiment of a modifiable cryptographic device.

Referring now to FIG. 4, an embodiment of a computer system 100 utilizing the modifiable cryptographic device is illustrated. The computer system 100 comprises a plurality of bus agents including a host processor 105, a memory device 110, an Peripheral Component Interconnect ("PCI") controller 115 and a modifiable cryptographic device 120 such as, for example, a "hardware agent" similar to that defined in previously filed U.S. Pat. Nos. 5,539,828, 5,805,712 and 5,796,840 authored by Derek L. Davis, the original inventor of the subject Application. The plurality of bus agents are coupled together through a system bus 125 which enables information to be communicated between these bus agents.

Being well-known in the computer industry, it is contemplated that more than one host processor could be employed within the computer system 100 although only the host processor 105 is illustrated in this embodiment. Moreover, the memory device 110 may include dynamic random access memory ("DRAM"), read only memory ("ROM"), video random access memory ("VRAM") and the like. The memory device 110 stores information for use by the host processor 105.

The PCI controller 115 is an interface between a PCI bus 130 and the system bus 125 which provides a communication path (e.g., gateway) for transferring information between components coupled to the system bus 125 or the PCI bus 130. The PCI bus 130 transfers information into and from at least one peripheral device in the computer system 100 including, but not limited to a display device 135 (e.g., cathode ray tube, liquid crystal display, etc.) for displaying images; an alphanumeric input device 140 (e.g., an alphanumeric keyboard, etc.) for communicating information and command selections to the host processor 105; a cursor control device 145 (e.g., a mouse, trackball, touch pad, etc.) for controlling cursor movement; a mass data storage device 150 (e.g., magnetic tapes, hard disk drive, floppy disk drive, etc.) for storing information; an information transceiver device 155 (fax machine, modem, scanner etc.) for transmitting information from the computer system 100 to another device and for receiving information from another device; and a hard copy device 160 (e.g., plotter, printer, etc.) for providing a tangible, visual representation of the information. It is contemplated that the computer system shown in FIG. 4 may employ some or all of these components or different components than those illustrated.

Figure 5:
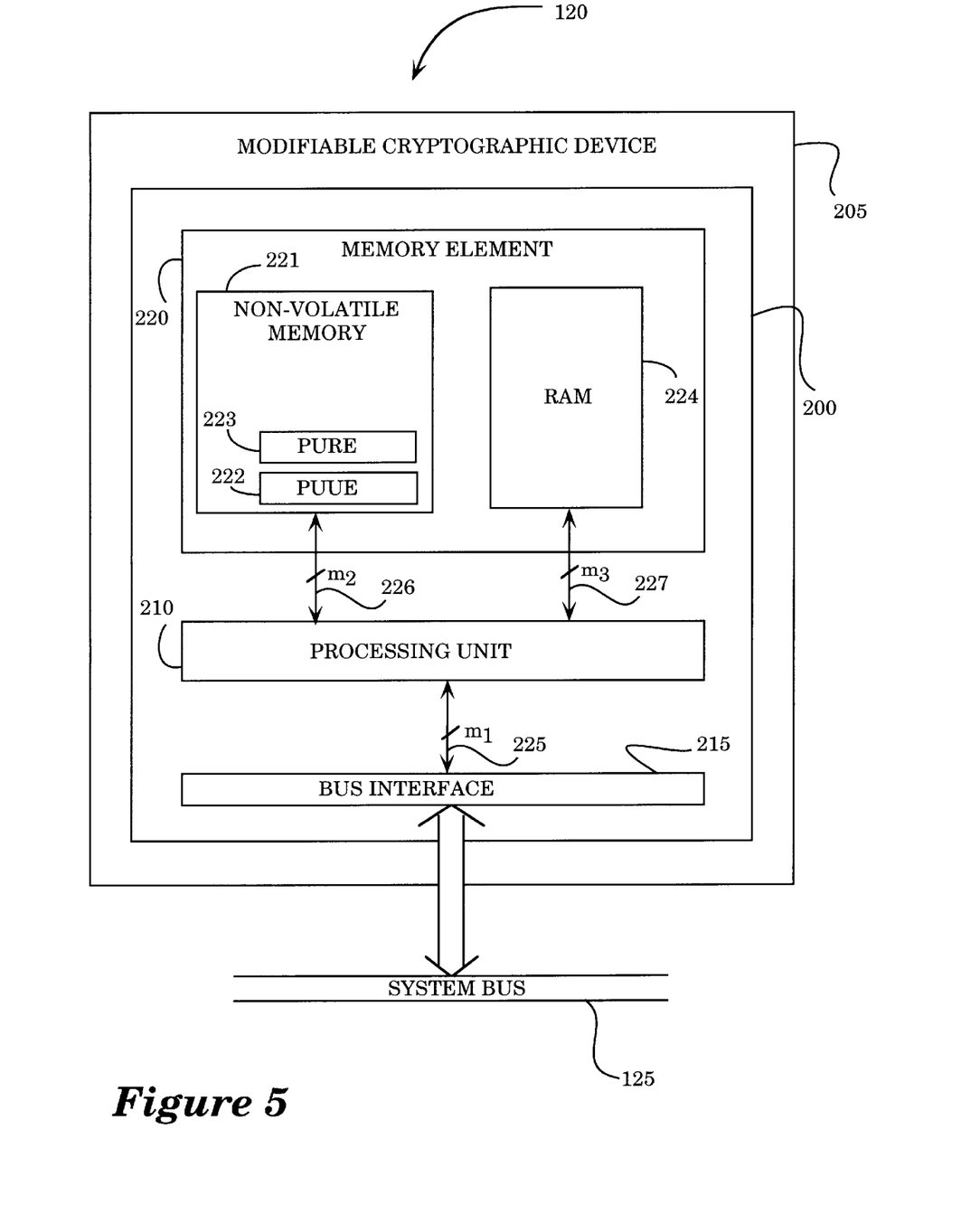
FIG. 5 is a block diagram of an illustrative embodiment of the cryptographic device modified after manufacture under proper authorization.

Referring to an illustrative embodiment of the modifiable cryptographic device as shown in FIG. 5, the modifiable cryptographic device 120 is coupled to the system bus 125 which establishes a communication path with the host processor 105 as well as the memory and PCI controller (not shown). In this embodiment, the modifiable cryptographic device 120 comprises a single integrated circuit in the form of a die 200 (e.g., a micro-controller) encapsulated within an integrated circuit component package 205, hermetically encapsulated if desired, to protect the die 200 from damage and harmful contaminants. Of course, the single integrated circuit is only one of many embodiments. For example, cryptographic device 120 may include a multi-die implementation where the memory and processing unit are on separate integrated circuits.

The die 200 comprises a processing unit 210 coupled to a bus interface 215 and a memory element 220 through a plurality of communication buses 225–227, respectively. These communication buses 225–227 are "m1", "m2" and m3" bits in width, where "m1" "m2" and m3" are arbitrary numbers. It is contemplated that if the cryptographic device requires encryption/decryption functionality, a unique public/private key pair may be stored in the memory element 220. Furthermore, a random number generator for generating information to produce a unique, device specific public/private key pair may be coupled to the processing unit 210.

The bus interface 215 enables information to be input into the modifiable cryptographic device 120 by a remote device (e.g., another computer system at the regulatory entity). The processing unit 210 performs computations internally within a secured environment of the die 200 based on the messages transmitted into the modifiable cryptographic device 120 by the regulatory entity. Such computations include modifying certain algorithms, writing to certain locations in the memory element 215, or activating the random number generator (if applicable). The processing unit 210 is placed within the die 200 to prevent access of the private key through virus attack, which is a common method of disrupting a computer system to obtain its private key and other means.

The memory element 220 includes a non-volatile memory element 221, such as flash memory, which stores appropriate cryptographic algorithms (e.g., Rivest, Shamir, Adleman "RSA" or "DES"), public key information for verification purposes and an unique public/private key pair if encryption is desired. This public key information may include a public key of a upgrade entity ("PUUE") 222 and/or a public key of the regulatory entity ("PURE") 223. The public keys 222 and 223 are used to verify that the upgrade message has originated from the upgrade entity and has been authorized by the regulatory entity. This non-volatile memory 221 is used primarily because it retains its contents when supply power is discontinued. The memory unit 220 further includes random access memory ("RAM") 224 in order to store certain results from the processing unit 210.

Although the modifiable cryptographic device 120 is implemented as a peripheral device on the system bus for greater security, it is contemplated that the cryptographic device 120 could be implemented in several other ways at the PC platform level such as, for example, as a disk controller or in a PCMCIA card to automatically decrypt and/or encrypt information being inputted therein. Furthermore, even though the cryptographic device 120 is described in connection with PC platforms, it is contemplated that such cryptographic device 120 could be implemented within any target node such as a fax machine, printer and the like or on a communication path between a computer and the PCI peripheral device.

Figure 6:
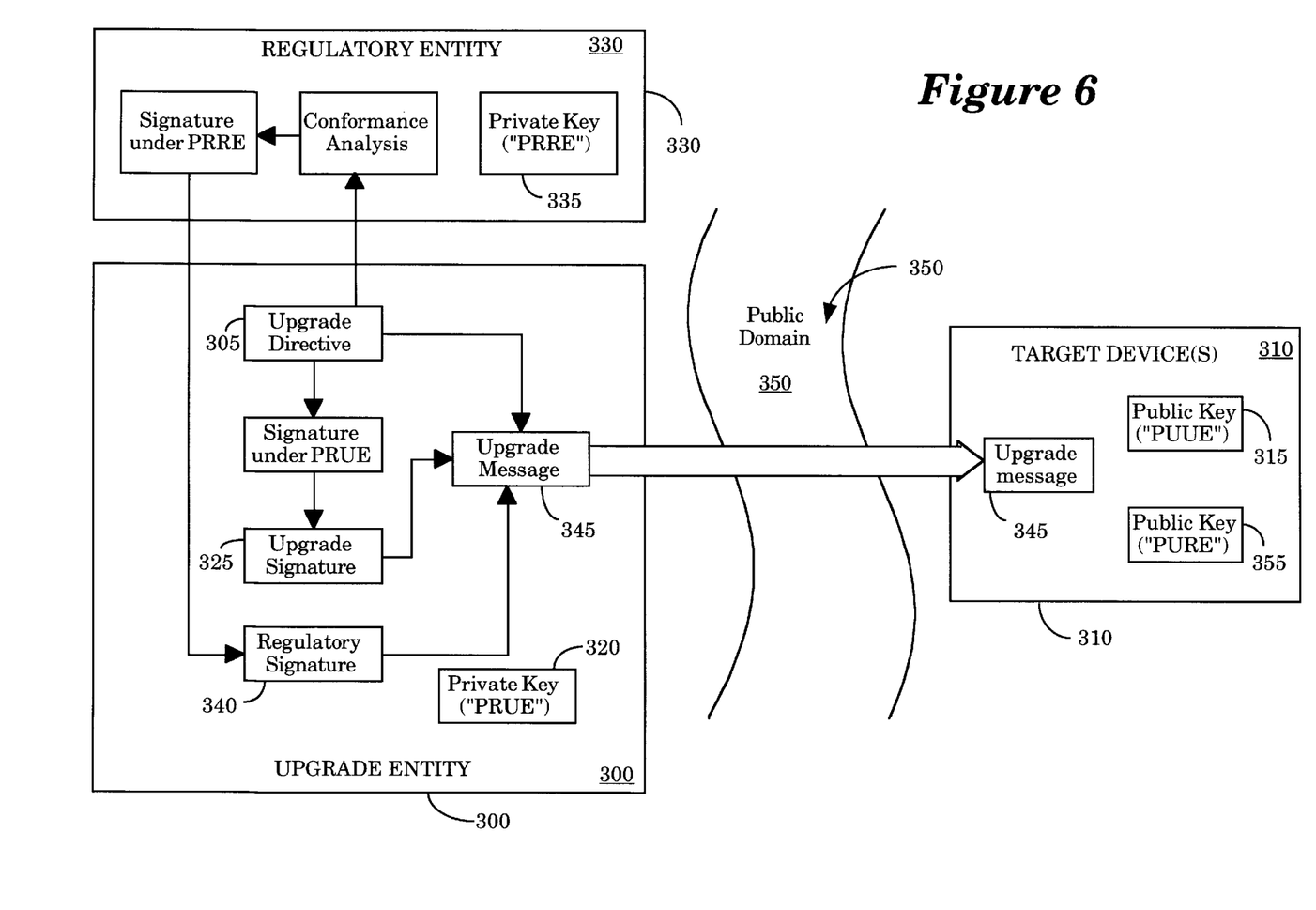
FIG. 6 is a block diagram illustrating an embodiment of the vetted field upgrade process performed for authorized modification of the cryptographic device of FIG. 5.

Referring to FIG. 6, an illustrative diagram of the vetted field upgrade process for modifying at least one regulated modifiable cryptographic device labeled "target device(s)" is shown. An upgrade entity 300 creates an upgrade directive 305 being a message to facilitate a specific functional change to occur. As stated, the upgrade entity 300 is a manufacturer of a target device (or set of target devices) 310 or any other entity authorized to create the upgrade directive 305. Such "authorization" is determined by which entity's public key ("PUUE") 315 embedded within the target device (s) 310. This upgrade directive 305, if accepted by the target device(s) 310, would effect certain changes in the functional characteristics of the target device(s) 310. For example, these changes might include, but are not limited to, (1) changing (e.g., modifying, adding or deleting) firmware or software, (2) enabling or disabling circuitry, (3) changing key lengths permitted for various operations and/or (4) changing other data such as public keys of authorized upgrade entities.

Once the upgrade directive 305 is created, the upgrade entity 300 applies its digital signature to the upgrade directive 305 using its own closely held private key "PRUE" 320 (e.g., a manufacturing key) to create an upgrade signature 325. In addition to this upgrade signature 325, if the target device(s) 310 is one that has been or is expected to be exported (e.g., still in inventory) or is otherwise limited in function by governmental regulation, the upgrade directive 305 is submitted to the appropriate regulatory entity 330 for "vetting". In doing so, the upgrade directive 305 may be encrypted for privacy reasons.

The regulatory agency 330, having full knowledge of the internal workings and programming of the pre-upgraded target device(s) 310, analyzes the upgrade directive 305 to determine if it would result only in modifications to the target device(s) 310 that would conform to current (export) regulations, related to domestic or foreign use. If conformance is assured, the regulatory entity 330 applies its digital signature using its closely held private key "PRRE" 335 in order to produce a regulatory signature 340. Thereafter, the regulatory entity 330 transfers the regulatory signature 340 to the upgrade entity 300.

An upgrade message 345, comprising the upgrade directive 305, the upgrade signature 325 and the regulatory signature 340, is distributed to the target device(s) 310, possibly through the public domain 350 as shown. It is contemplated that the upgrade message 345 may be encrypted in accordance with those symmetric/asymmetric cryptographic techniques highlighted in FIGS. 1–3 in order to provide an extra degree of protection (privacy) in the upgrade process. Such encryption might be done in order to control distribution of such upgrade messages to only a targeted subset of potential recipients or to protect proprietary content from competitors.

Upon receiving the upgrade message 345, each target device(s) 310 decrypts the upgrade directive 305 (if applicable), verifies the upgrade signature 325 using the embedded PUUE 320 and verifies the regulatory signature 340 using an embedded public key of the regulatory entity "PURE" 355. Thus, the target device(s) 310 proceeds with the upgrade operations as specified by the upgrade directive 305 only after successful decryption (if applicable) and verification.

Figure 7:
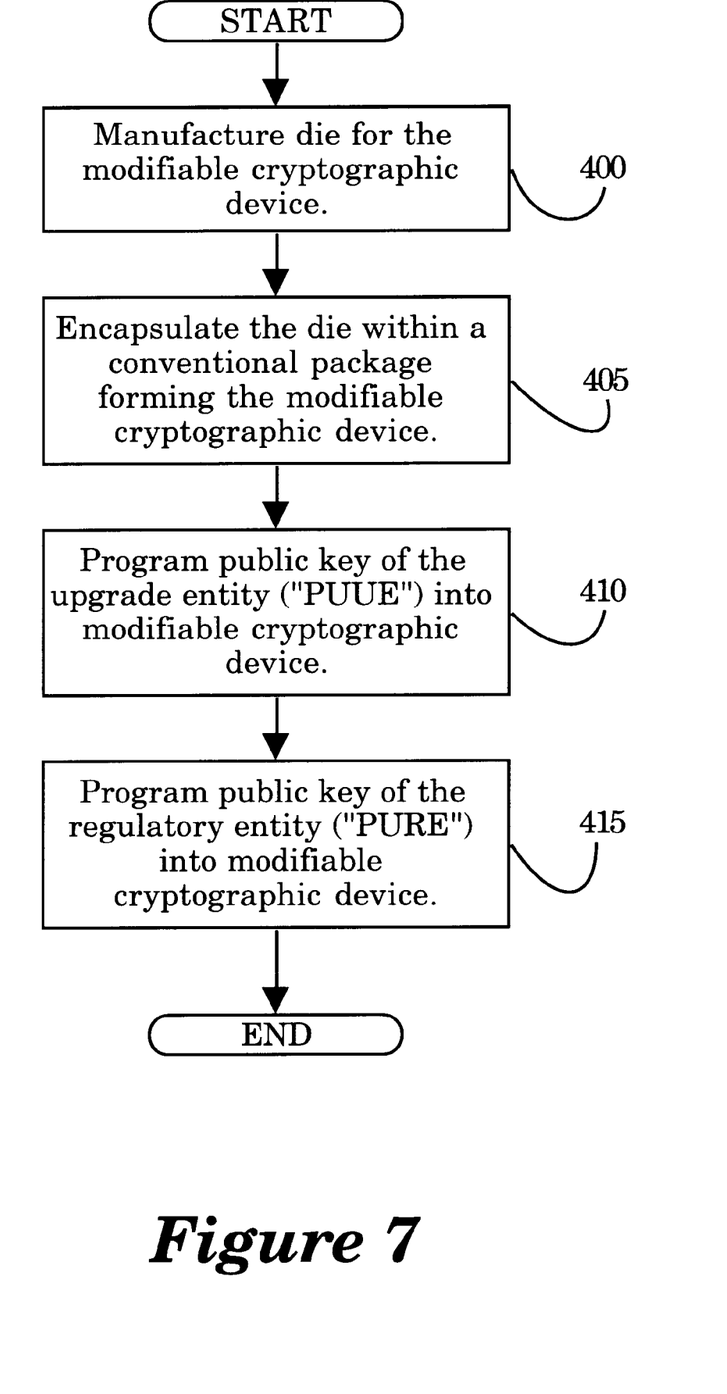
FIG. 7 is a flowchart illustrating the method of manufacture of the cryptographic device of FIG. 5.

Referring to FIG. 7, a flowchart of the operations for manufacturing an embodiment of the present invention is illustrated. First, in block 400, the die of the modifiable cryptographic device is manufactured according to any conventional well-known semiconductor manufacturing technique. Next, the die is encapsulated within a semiconductor package so as to form the modifiable cryptographic device (block 405). Thereafter, in block 410, the public key of the upgrade entity ("PUUE") is programmed into the non-volatile memory of the modifiable cryptographic device. At this point, the modifiable cryptographic device is capable of remotely receiving information from the upgrade entity to modify the cryptographic device in certain instances. Alternatively, in block 415, the public key of the regulatory entity ("PURE") may be programmed into the non-volatile memory for regulatory authorization verification.

Referring to FIGS. 8A–8D, a number of flowcharts are presented in order to illustrate one manner of exclusively modifying a "target" cryptographic device. With respect to FIG. 8A, the upgrade entity creates an upgrade directive for modifying a "regulated", modifiable cryptographic device (block 500). After such creation, the upgrade entity digitally signs the upgrade directive with its private key ("PRUE") in order to create an upgrade signature to be later appended to an upgrade message (block 505). Next, the upgrade entity submits the upgrade directive to a regulatory entity (block 510). It is contemplated, however, that the upgrade directive may be encrypted with a widely published public key of the regulatory entity ("PURE") to provide privacy in the upgrade entity's dealings with the regulatory entity.

Figure 8A:
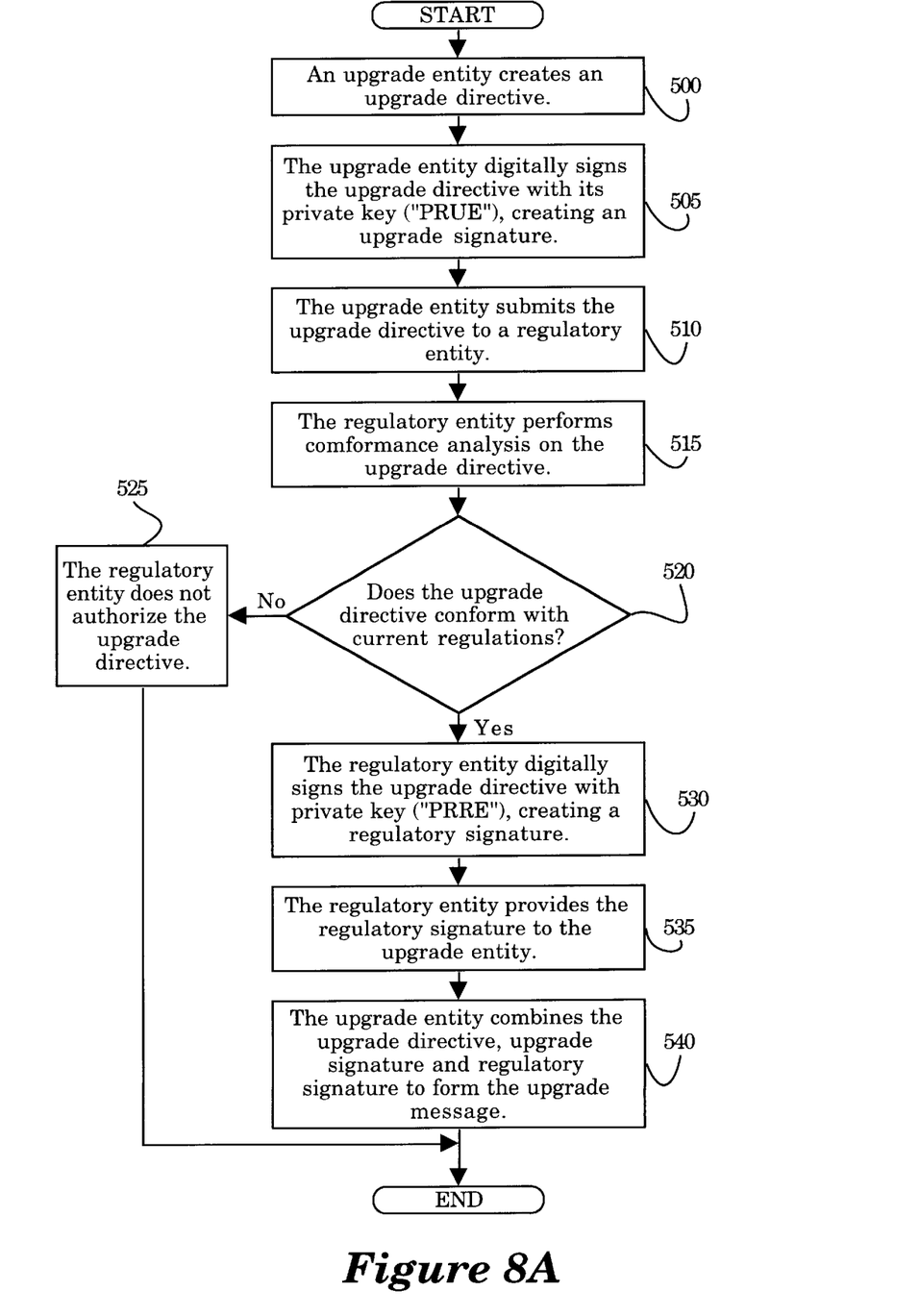
FIGS. 8A–8D are flowcharts illustrating the upgrading operations taken by the upgrade entity, regulatory entity and the cryptographic device.

The regulatory entity receives the upgrade direction (possibly in encrypted form) and performs various tests and checks to verify that the upgrade directive fully conforms with all current regulations, domestic and/or export (blocks 515 and 520). If the upgrade directive does not fully comply with current regulations, the regulatory entity refuses to authorize the upgrade directive thereby preventing the cryptographic device from being modified (block 525). Alternatively, if the upgrade directive fully complies with all current regulations, the regulatory entity digitally signs the upgrade directive with its private key ("PRRE") in order to create a regulatory signature (block 530).

After producing the regulatory signature, the regulatory entity transmits the regulatory signature to the upgrade entity (block 535). Thereafter, the upgrade entity, having both the upgrade signature and the regulatory signature, forms an upgrade message by appending these signatures with the upgrade directive (block 540).

Figure 8B:
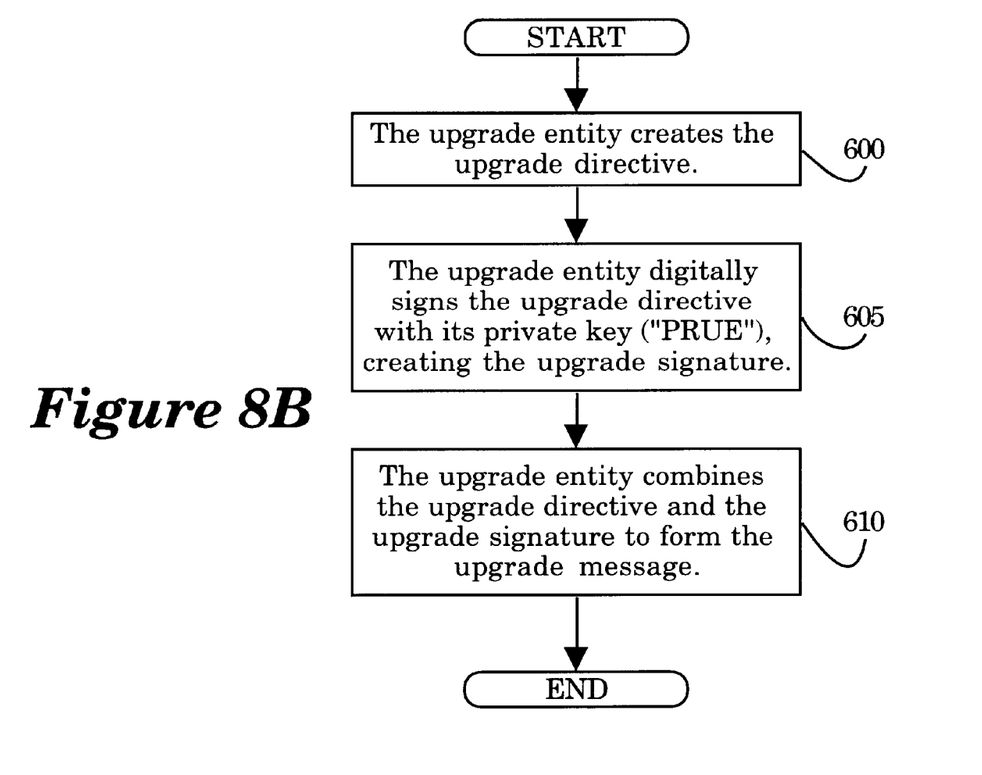

As shown in FIG. 8B, there may be situations where authorization by the regulatory entity is not necessary such as for modification of a non-regulated cryptographic device. In such case, the first two steps in forming the upgrade message are identical to the first two steps of FIG. 8A; namely creating the upgrade directive and upgrade signatures (blocks 600 and 605). However, instead of soliciting a regulatory signature, the upgrade entity forms the upgrade message from both the upgrade directive and the upgrade signature (block 610).

Figure 8C:
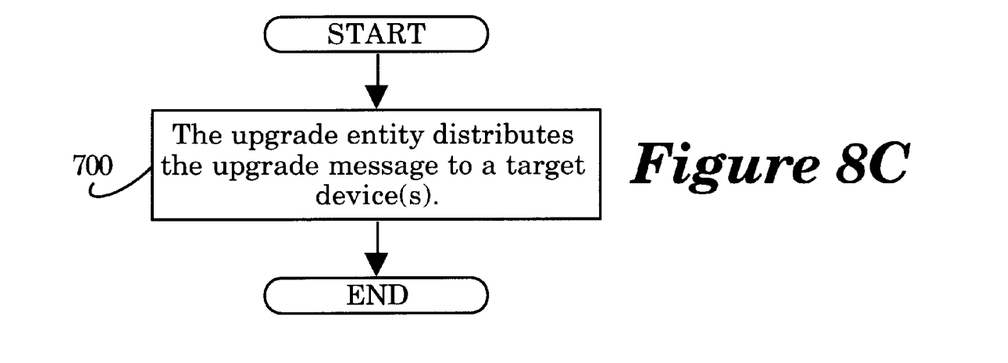

Referring now to FIG. 8C, upon forming the upgrade message in a manner as shown for example in FIG. 8A or FIG. 8B, the upgrade entity distributes the upgrade message through electronic networking communications, floppy disks, PCMCIA cards or any other method of distribution to a target device(s) (block 700). For further protection, the upgrade message may be encrypted with a device-specific public key of the target device to ensure that only the target device can read and react to the upgrade message.

Figure 8D:
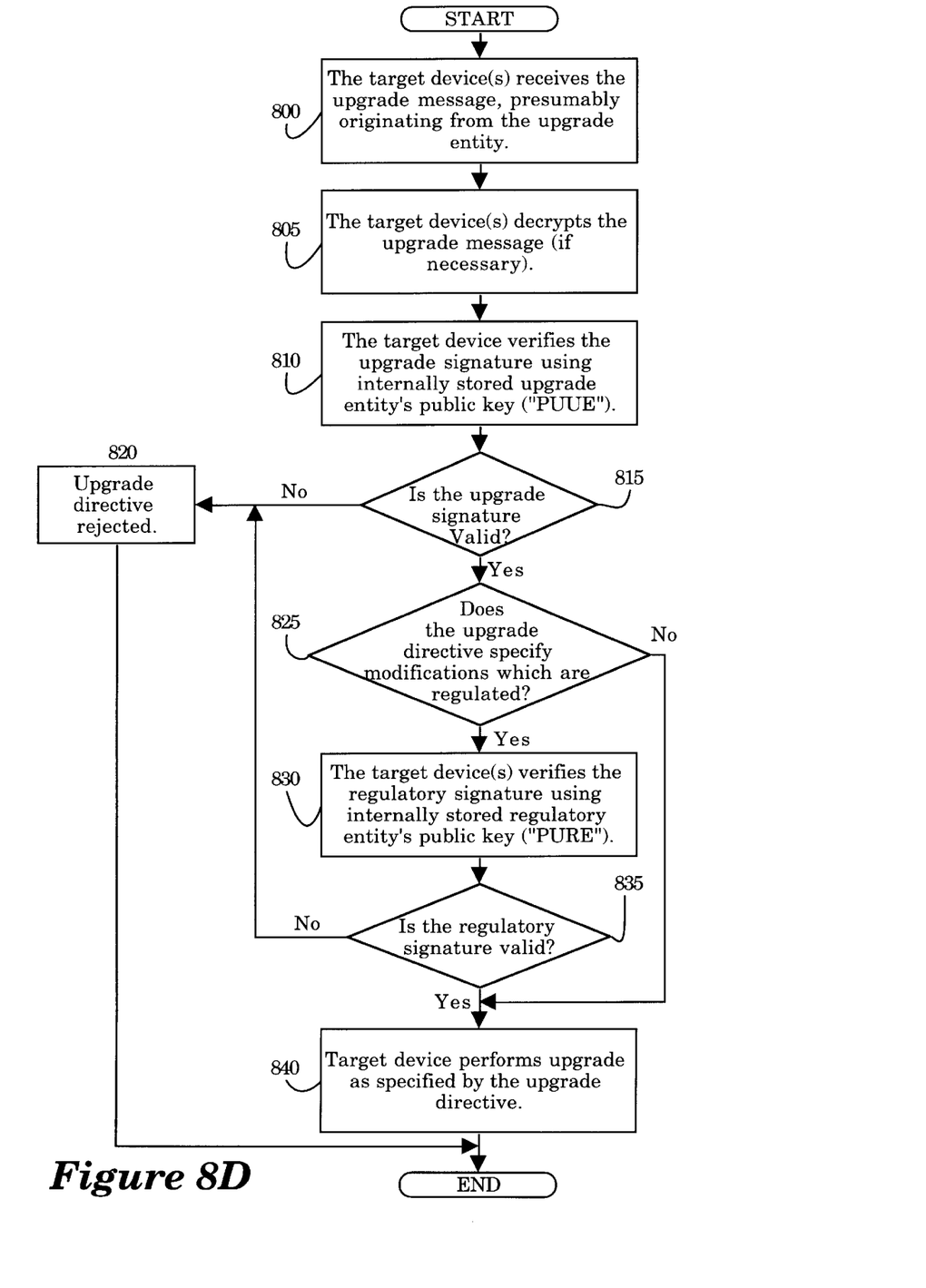

As illustrated in FIG. 8D, upon receiving the upgrade message and decrypting the message (if necessary), the target device(s) verifies that the upgrade message is authorized by the upgrade entity by determining if the upgrade signature is valid (blocks 800–815). Such determination is accomplished by decrypting the upgrade signature with the internally stored public key of the upgrade entity ("PUUE") and performing comparison checks. If the upgrade signature is invalid, the upgrade directive is ignored by the target device(s) (block 820).

In the event that the upgrade signature is valid, if the target device(s) is "non-regulated", it performs the modification associated with the upgrade directive (blocks 825 and 840). If the target device(s) is "regulated", a verification is made whether the regulating signature is valid, namely, that it originates from the regulatory entity (blocks 830 and 835). This is accomplished by decrypting the regulatory signature with the internally stored public key of the regulatory entity ("PURE"). If the regulatory signature is valid, the target device(s) performs the modification (block 840). Otherwise, the upgrade directive is ignored (block 820).

The present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follows.

What is claimed is:

1. In a communication system accessible by a regulatory entity and an upgrade entity, a computer system comprising:
   a Peripheral Component Interconnect (PCI) controller; and
   a modifiable cryptographic device coupled to the PCI controller, the modifiable cryptographic device including
      a package including an interface to receive an upgrade message including an upgrade directive, an upgrade signature and a regulatory signature,
      a non-volatile memory element implemented in the package, the non-volatile memory to contain at least a public key of the upgrade entity and a public key of the regulatory entity, and
      a processor coupled to the non-volatile memory element and implemented in the package, the processor to (i) decrypt the upgrade signature with the public key of the upgrade entity to verify that the upgrade message originated from the upgrade entity, (ii) decrypt the regulatory signature with the public key of the regulatory entity to verify that the upgrade message is authorized by the regulatory entity, and (iii) change information being stored in the non-volatile memory element in accordance with the upgrade directive if the upgrade message originated from the upgrade entity and has been authorized by the regulatory entity.

2. The computer system according to claim 1, wherein the non-volatile memory element further stores a cryptographic algorithm.

3. The computer system according to claim 1, further comprising a volatile storage element coupled to the processor.

4. The computer system according to claim 1, further comprising a random number generator coupled to the processor.

5. A method for ensuring authorized modification of a cryptographic device under direction of an upgrade entity, the method comprising:
   receiving an upgrade message by the cryptographic device including a processor and memory protected by a package, the upgrade message including (i) an upgrade directive being a first message requesting a change of information contained in the cryptographic device, (ii) an upgrade signature being a second message encrypted with a private key of the upgrade entity, and (iii) a regulatory signature being a third message encrypted with a private key of a regulatory entity;
   verifying that the upgrade message is valid within the cryptographic device; and
   changing the information contained in the cryptographic device in accordance with the upgrade message.

6. The method according to claim 5, wherein prior to receiving the upgrade message, the method further comprises:
   encrypting the upgrade message with a public key of the cryptographic device.

7. The method according to claim 5, wherein verifying the validity of the upgrade message further comprises:
   verifying that the regulatory entity authorizes modification of the information contained in the cryptographic device by decrypting the regulatory signature with a public key of the regulatory entity stored internally within the cryptographic device.

8. The method of claim 5, wherein the changing of the information includes (i) deleting a cryptographic algorithm stored in the cryptographic device, and (ii) modifying a portion of the cryptographic algorithm to update the cryptographic algorithm.

9. A method for ensuring authorized modification of a cryptographic device, the method comprising:
   (1) receiving an upgrade message including an upgrade directive, an upgrade signature being a first message encrypted with a private key of an upgrade entity, and a regulatory signature being a second message encrypted with a private key of a regulatory entity;

(2) verifying that the upgrade message is valid by: (i) decrypting the upgrade signature with a public key of the upgrade entity stored internally within the cryptographic device, (ii) determining that the contents of the decrypted upgrade signature are identical to the first message, (iii) decrypting the regulatory signature with a public key of the regulatory entity stored internally within the cryptographic device, and (iv) determining that the contents of the decrypted regulatory signature are identical to the second message; and (3) changing stored contents of the cryptographic device if the upgrade message is valid.

10. The method according to claim 9, wherein prior to changing the stored contents, the method further comprises:

verifying that the regulatory entity has authorized modification of the cryptographic device.

11. The method according to claim 9, wherein prior to receiving the upgrade message the method further comprises:

encrypting the upgrade message with a public key of the cryptographic device.

12. The method according to claim 11, wherein prior to verifying the validity of the upgrade message, the method further comprises:

decrypting the upgrade message with a private key of the cryptographic device, the private key internally stored within the cryptographic device.

13. The method according to claim 9, wherein the first message is based on the upgrade directive.

14. The method according to claim 13, wherein the first message is a hashed result of the upgrade directive.

15. The method according to claim 9, wherein the second message is based on the upgrade directive.

16. The method according to claim 15, wherein the second message is a hashed result of the upgrade directive.

17. A method for ensuring authorized modification of a cryptographic device, the method comprising:

receiving an upgrade message including an upgrade directive, an upgrade signature being a first message encrypted with a private key of an upgrade entity, and a regulatory signature being a second message encrypted with a private key of a regulatory entity;

verifying that the upgrade message is valid within the cryptographic device by (i) decrypting the upgrade signature with a public key of the upgrade entity stored internally within the cryptographic device, (ii) determining whether contents of the decrypted upgrade signature are identical to the first message, and if so (iii) decrypting the regulatory signature with a public key of the regulatory entity stored internally within the cryptographic device, (iv) determining whether contents of the decrypted regulatory signature are identical to the second message, and (v) modifying contents of the cryptographic device.

18. A modifiable cryptographic device capable of receiving an upgrade message including at least an upgrade directive, a regulatory signature and a upgrade signature, from a remote entity, the modifiable cryptographic device comprising:

a package;

a memory element placed in the package, the memory element to contain at least a public key of the remote entity and software; and a processor coupled to the memory element and placed in the package, the processor to decrypt the upgrade signature with the public key of the remote entity in order to verify that the upgrade message originated from the remote entity, and to enable software within the modifiable cryptographic device to be changed in accordance with the upgrade directive if the upgrade message originated from the remote entity.

19. The modifiable cryptographic device according to claim 18, wherein the memory element further contains a public key of a regulatory entity.

20. The modifiable cryptographic device according to claim 18 further including circuitry enabled or disabled by the processor in accordance with the upgrade message.

21. The modifiable cryptographic device according to claim 18, wherein the processor to modify the public key of the remote entity.

22. A modifiable cryptographic device comprising:

an integrated circuit package;

a non-volatile memory element placed in the integrated circuit package the non-volatile memory element to contain software including a first cryptographic program and a second cryptographic program; and a processor placed in the integrated circuit package, the processor to change the software from the first cryptographic program to a second cryptographic program in accordance with an upgrade directive of an upgrade message if the upgrade message (i) originated from an upgrade entity and (ii) has been authorized by a regulatory entity.

23. The modifiable cryptographic device according to claim 22, further comprising a volatile storage element coupled to the processor.

24. The modifiable cryptographic device according to claim 22, further comprising a random number generator coupled to the processor.

25. A computer system comprising:

a peripheral device; and a modifiable cryptographic device for communication with the peripheral device to receive an upgrade message including an upgrade directive, an upgrade signature and a regulatory signature, the modifiable cryptographic device including a non-volatile memory element to contain at least a first public key being a public key of an upgrade entity and a second public key being a public key of a regulatory entity, a processor coupled to the non-volatile memory element, the processor to decrypt the upgrade signature with the first public key and the regulatory signature with the second public key, and to change information being stored in the non-volatile memory element in accordance with the upgrade directive if the upgrade message (i) originated from the upgrade entity and (ii) has been authorized by the regulatory entity, and a package including the non-volatile memory and the processor.

26. A method for ensuring an authorized modification of a device, the method comprising:

receiving an upgrade message including an upgrade directive, an upgrade signature being a first message encrypted with a private key of an upgrade entity, and a regulatory signature being a second message encrypted with a private key of a regulatory entity;

verifying within the device that the upgrade message is valid and that modification of the device has been authorized; and changing stored contents of the device if the upgrade message is valid and that modification of the device has been authorized.

27. The method according to claim 26, wherein prior to the verifying of the upgrade message, the method further comprises:

decrypting the upgrade message with a private key of the device, the private key internally stored within the device.

28. The method according to claim 26, wherein the verifying of the upgrade message further comprises:

decrypting the upgrade signature with a public key of the upgrade entity stored internally within the device; and determining whether contents of the decrypted upgrade signature are identical to the first message.

29. The method according to claim 28, wherein the determining includes hashing an upgrade directive to produce a result; and comparing the result to the first message.

30. The method according to claim 28, wherein the verifying of the upgrade message further comprises:

decrypting the regulatory signature with a public key of the regulatory entity stored internally within the device if the decrypted upgrade signature is identical to the second message; and determining whether contents of the decrypted regulatory signature are identical to the second message.

31. The method according to claim 30, wherein the determining includes hashing an upgrade directive to produce a result; and comparing the result to the second message.

32. The method according to claim 26, wherein the device includes a cryptographic device.

* * * * *